US012767788B2

(12) United States Patent
Kömmelt et al.

(10) Patent No.: US 12,767,788 B2
(45) Date of Patent: Oct. 20, 2026

(54) COMPOSITE RESINS COMPRISING UNSATURATED PHOSPHATE COMPOUNDS

(71) Applicant: Evonik Operations GmbH, Essen (DE)

(72) Inventors: Sabine Kömmelt, Darmstadt (DE); Sebastian Bestgen, Eschborn (DE); Margarita Stein, Sulzbach (DE); Elisabeth Clamer, Darmstadt (DE); Evert Jan Temmink, Enschede (NL)

(73) Assignee: Evonik Operations GmbH, Essen (DE)

( * ) Notice: Subject to any disclaimer, the term of this patent is extended or adjusted under 35 U.S.C. 154(b) by 713 days.

(21) Appl. No.: 18/250,992

(22) PCT Filed: Oct. 4, 2021

(86) PCT No.: PCT/EP2021/077224
§ 371 (c)(1),
(2) Date: Apr. 28, 2023

(87) PCT Pub. No.: WO2022/089879
PCT Pub. Date: May 5, 2022

(65) Prior Publication Data
US 2023/0407048 A1 Dec. 21, 2023

(30) Foreign Application Priority Data
Oct. 28, 2020 (EP) .................................... 20204297

(51) Int. Cl.
*C08K 5/098* (2006.01)
*C08J 3/20* (2006.01)
(Continued)

(52) U.S. Cl.
CPC ................. *C08K 5/098* (2013.01); *C08J 3/20* (2013.01); *C08J 5/246* (2021.05); *C08K 5/14* (2013.01); *C08K 5/521* (2013.01); *C08J 2467/06* (2013.01)

(58) Field of Classification Search
CPC .......... C08K 5/098; C08K 5/14; C08K 5/521; C08J 5/246; C08J 3/20; C08J 2467/06
(Continued)

(56) References Cited

U.S. PATENT DOCUMENTS

2015/0291734 A1* 10/2015 Hilker .................. C08G 63/918 525/445
2023/0203275 A1* 6/2023 Ostendorf ................ C08K 5/19 524/493

FOREIGN PATENT DOCUMENTS

EP 0 366 190 5/1990
EP 0 781 602 7/1997
(Continued)

OTHER PUBLICATIONS

International Search report issued Dec. 9, 2021, in PCT/EP2021/077224, 5 pages.

(Continued)

*Primary Examiner* — Robert S Jones, Jr.
*Assistant Examiner* — Elizabeth Amato
(74) *Attorney, Agent, or Firm* — Grüneberg Global IP, PLLC

(57) ABSTRACT

A reactive diluent system for composite resins contains a reactive diluent composition, which contains an organic phosphorus compound, and an accelerator system. The accelerator system contains at least one iron salt or complex, at least one transition metal salt or complex selected from cobalt and copper, and optionally at least one solvent.

18 Claims, 1 Drawing Sheet

(51) Int. Cl.
*C08J 5/24* (2006.01)
*C08K 5/14* (2006.01)
*C08K 5/521* (2006.01)

(58) Field of Classification Search
USPC .......................................................... 524/394
See application file for complete search history.

(56) References Cited

FOREIGN PATENT DOCUMENTS

| | | | | |
|---|---|---|---|---|
| EP | 0781802 A2 * | 7/1997 | ............. C08K 5/521 |
| JP | 6-345820 A | 12/1994 | |
| JP | 2003-222717 A | 8/2003 | |
| WO | 2011/157673 | 12/2011 | |

OTHER PUBLICATIONS

Written Opinion issued Dec. 9, 2021, in PCT/EP2021/077224, 9 pages.

* cited by examiner

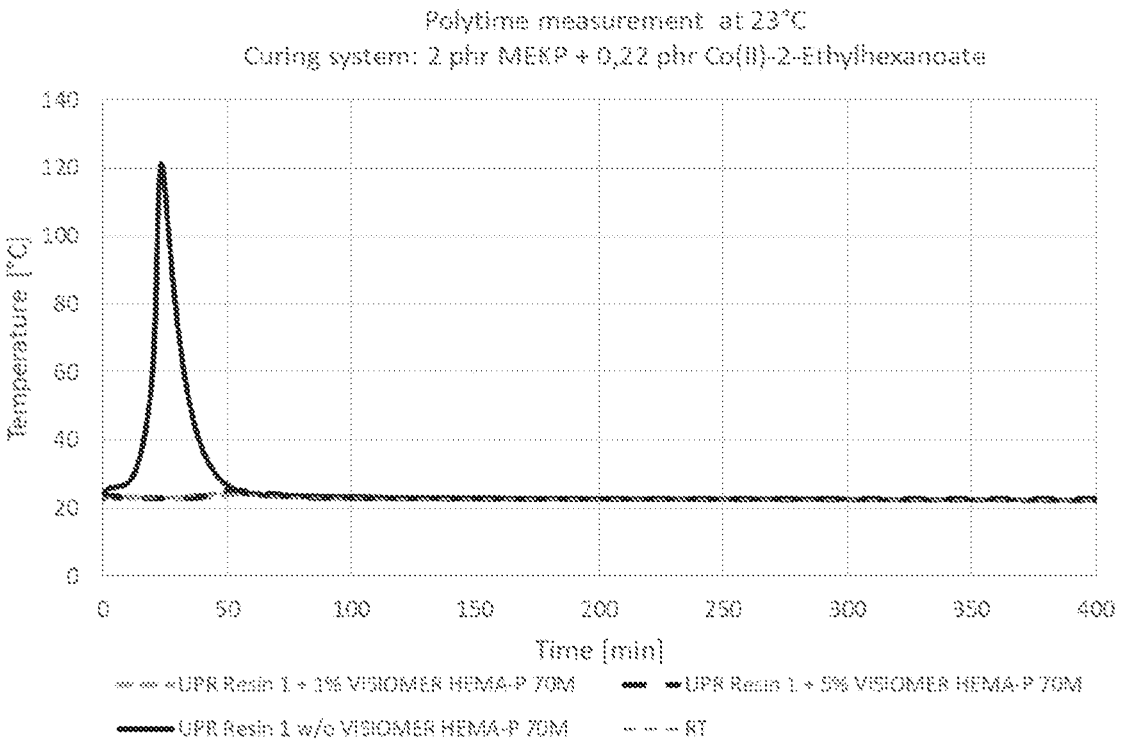
Polytime measurement at 23°C
Curing system: 2 phr MEKP + 0,22 phr Co(II)-2-Ethylhexanoate
Temperature [°C]
0
20
40
60
80
100
120
140
0
50
100
150
200
250
300
350
400
Time [min]
UPR Resin 1 + 1% VISIOMER HEMA-P 70M
UPR Resin 1 + 5% VISIOMER HEMA-P 70M
UPR Resin 1 w/o VISIOMER HEMA-P 70M
RT

COMPOSITE RESINS COMPRISING UNSATURATED PHOSPHATE COMPOUNDS

CROSS-REFERENCE TO RELATED APPLICATIONS

This application is the National Stage entry under § 371 of International Application No. PCT/EP2021/077224, filed on Oct. 4, 2021, and which claims the benefit of priority to European Application No. 20204297.4, filed on Oct. 28, 2020. The content of each of these applications is hereby incorporated by reference in its entirety.

BACKGROUND OF THE INVENTION

Field of the Invention

The invention relates to a reactive diluent system for composite resins comprising (a) a reactive diluent composition comprising an organic (meth)acrylate-based phosphorus compound and (b) an accelerator system.

Description of Related Art

Unsaturated (meth)acrylate-based phosphate esters such as 2-hydroxyethyl-methacrylate-phosphate are well-known adhesion promoters in applications like adhesives or coating resins providing improved adhesion to polar substrates. Additionally, the incorporation of (meth)acrylate-based phosphate esters can improve the corrosion protection of emulsion-based coating formulations due to the improved adhesion. Furthermore, phosphor-based compounds are well-known to improve flame-retardant properties. The incorporation of unsaturated (meth)acrylate-based phosphate esters into polymeric resins leads to the formation of flame-retardant materials. Especially in composite applications like transportation and construction flame-retardant properties are of high interest. In these application areas, vinyl ester and unsaturated polyester resins are the main type of resins used. These resins typically contain styrene as a reactive diluent. Besides styrene, also other reactive diluents or reactive solvents are used e.g. vinyl toluene or (meth) acrylate esters. Unsaturated (meth)acrylate-based phosphate esters provide the option to be used as reactive diluent imparting flame-retardant properties. This is of special interest for application areas where a combination of flame-retardancy and optical transparency is needed. Additionally, unsaturated (meth)acrylate-based phosphate esters enhance the glass-fiber adhesion in fiber reinforced plastics.

For curing composite resins, redox systems comprising an oxidizing agent (e.g. a peroxide) and soluble cobalt ions as accelerator are commonly used. The accelerator increases the activity of the oxidizing agent at lower temperatures—such as room temperature (RT)—and, consequently, speeds up the curing. The cobalt ion can be present in form of a cobalt salt and/or in form of a cobalt complex.

However, composite resins in combination with unsaturated phosphoric acid esters do not sufficiently cure with standard RT curing systems based on cobalt. The phosphoric acid esters decrease the stability of the cobalt complex and therefore reduce the activity of the accelerator. Additionally, it is well known that cobalt accelerated methyl ethyl ketone peroxide (MEKP) systems show a low ability to effectively form radicals with acrylic monomers in the absence of styrene. The most common initiator/accelerator system currently practiced with acrylic resin systems is benzoyl peroxide (BPO) with a tertiary amine accelerator. However, the use of an amine is less than ideal due to potential salt formation with the unsaturated phosphoric acid esters and known discoloration issues by exposure to light or heat of the final composite material.

SUMMARY OF THE INVENTION

Accordingly, it was the objective of the present invention to provide a suitable accelerator system for such phosphate reactive diluents. In other words, the problem to be solved by the present invention is the provision of a reactive diluent system including an organic (meth)acrylate-based phosphorus compound as reactive diluent and an optimized accelerator system.

This objective has been successfully solved by the present invention: The inventors have unexpectedly found that resin compositions comprising a reactive diluent system based on an organic (meth)acrylate-based phosphorus compound can be effectively cured with a curable resin composition under mild conditions (i.e. via RT curing) using an accelerator system comprising at least one iron salt or complex combined with at least one cobalt or copper salt or complex.

Generally, and by way of brief description, the main aspects of the present invention can be described as follows:

In a first aspect, the present invention provides a reactive diluent system for composite resins comprising (a) a reactive diluent composition and (b) an accelerator system, wherein the reactive diluent composition (a) comprises or consists of an organic phosphorus compound of the general formula (I)

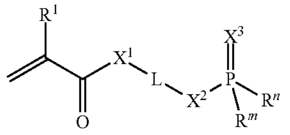

(I)

with $R^1$=H, Me $R^n$, $R^m$=$O^-$, OH, Z, $X^2$—R(=$X^3$)$R^{n+1}R^{m+1}$ n, m=2-15

$X^1$, $X^2$=O, $CH_2$, S, NH $X^3$=S

Z = 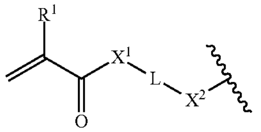

and L being a hydrocarbon linker optionally comprising one or more heteroatoms; and the accelerator system (b) comprises or consists of (i) at least one iron salt or complex;

(ii) at least one transition metal salt or complex based on cobalt and copper; and (iii) optionally at least one solvent.

In a second aspect, the invention pertains to a curable resin composition comprising a curable resin and the reactive diluent system described above and, as a third aspect, to the use of said reactive diluent system or of said curable resin composition for preparing composite resins with flame-retardant properties or for preparing composite resins with enhanced glass fiber adhesion.

In a fourth aspect, the invention provides a method of preparing a cured composite resin composition, the method comprising (a) providing a curable resin composition as described above (b) optionally adding at least one organic or inorganic additive, and (c) initiating the curing process by adding an initiator.

In a fifth aspect, the present invention is directed to a fiber-reinforced material comprising (a) a polymer resin selected from the group consisting of (meth)acrylate resins, unsaturated polyester resins (UPR) or vinyl ester resins (VER); and (b) at least one reinforcing fiber material, said fiber-reinforced material being obtainable by curing the components (a) and (b) in the presence of an initiator using the reactive diluent system as described above.

BRIEF DESCRIPTION OF THE DRAWING

The FIGURE shows the polymerization time measurement for UPR 1 in the presence of VISIOMER HEMA-P 70M in comparison to the styrene-based references using a standard cobalt-based curing system.

DETAILED DESCRIPTION OF THE INVENTION

In the following, the elements of the invention will be described. These elements are listed with specific embodiments; however, it should be understood that they may be combined in any manner and in any number to create additional embodiments. The variously described examples and preferred embodiments should not be construed to limit the present invention to only the explicitly described embodiments. This description should be understood to support and encompass embodiments which combine two or more of the explicitly described embodiments or which combine the one or more of the explicitly described embodiments with any number of the disclosed and/or preferred elements. Furthermore, any permutations and combinations of all described elements in this application should be considered disclosed by the description of the present application unless the context indicates otherwise.

The terms "of the invention", "in accordance with the invention", "according to the invention" and the like, as used herein are intended to refer to all aspects and embodiments of the invention described herein.

As used herein, the term "comprising" is to be construed as encompassing both "including" and "consisting of", both meanings being specifically intended, and hence individually disclosed embodiments in accordance with the present invention. Where used herein, "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

It is to be understood that the application of the teachings of the present invention to a specific problem or environment, and the inclusion of variations of the present invention or additional features thereto (such as further aspects and embodiments), will be within the capabilities of one having ordinary skill in the art in light of the teachings contained herein.

Unless context dictates otherwise, the descriptions and definitions of the features set out above are not limited to any particular aspect or embodiment of the invention and apply equally to all aspects and embodiments which are described.

Within the context of the present invention, the term "(meth)acrylate" refers to esters of methacrylic acid or of acrylic acid.

As used herein, the term "reactive diluent" or reactive solvent refers to solvents reactive during the curing step. They typically are comprised of ethylenically unsaturated monomeric compounds. In the context of the present invention, a "reactive diluent composition" is a composition comprising or consisting of at least one reactive diluent. A "reactive diluent system" includes the reactive diluent composition and an accelerator system.

A coordination compound is a substance consisting of one or more metal atoms or ions surrounded by an array of bound molecules or ions, which are known as ligands or complexing agents. A coordination compound whose center is a metal atom/ion is called a metal complex. Coordination compounds may be ionic and exist as cationic or anionic species in combination with various corresponding counterions.

All references, patents, and publications cited herein are hereby incorporated by reference in their entirety.

The present invention is predicated on the surprising finding that resin compositions comprising a curable resin and an reactive diluent system based on an organic (meth) acrylate-based phosphorus compound can be effectively cured under mild conditions (i.e. via RT curing) using an accelerator system comprising at least one iron salt or complex combined with at least one salt or complex selected from cobalt and copper.

The Reactive Diluent System

The Reactive Diluent Composition (a)

The reactive diluent composition (a) comprises or consists of an organic phosphorus compound of the general formula (I)

(I)

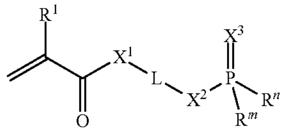

with $R^1$=H, Me $R''$, $R'''$=$O^-$, OH, Z, $X^2$—$R(=X^3)R''^{+1}R'''^{+1}$ n, m=2-15

$X^1$, $X^2$=O, $CH_2$, S, NH $X^3$=S

Z =

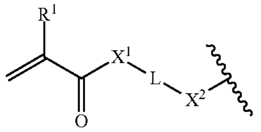

and L being a hydrocarbon linker optionally comprising one or more heteroatoms.

Accordingly, the linker moiety connects the phosphorus unit with the ethylenically unsaturated, polymerizable monomer unit. As used in the context of the present invention, the term "hydrocarbon linker" includes linker being linear and/or branched aliphatic (e.g. alkyl or alkenyl), alicyclic (e.g. cycloalkyl, cycloalkenyl), and aromatic with aromatic, aliphatic, alicyclic-substituted aromatic substituents, as well as cyclic substituents wherein the ring is completed through another portion of the molecule (e.g. two substituents forming one ring together).

The term "hydrocarbon linker" includes a linker with substituted hydrocarbon substituents, that is, substituents containing non-hydrocarbon groups which do not alter the predominantly hydrocarbon nature of the linker (e.g. chloro, fluoro, bromo, iodo, hydroxy, alkoxy, mercapto, alkylmercapto, alkylhydroxy, nitro, amino, nitroso, sulfoxy.

The term "hydrocarbon linker" also includes a linker with hetero substituents, that is, substituents which, while having a predominantly hydrocarbon character, contain other than carbon in a ring or chain otherwise composed of carbon atoms. Also included are ethylene oxide (EO) and propylene oxide (PO) linkers. Heteroatoms include sulfur, oxygen, nitrogen, and encompass substituents as pyridyl, furyl, imidazolyl and other heterocycles.

The hydrocarbon linker may be a $C_0$-$C_{70}$ hydrocarbon linking group having oxygen and/or nitrogen and/or sulfur atoms substituted for carbon atoms.

The linker may for instance be $X^1(CH_2CH_2O)_x$—P ($X^2$=O in this case) with x=1-20.

In one embodiment of the present invention, the organic phosphorus compound of formula (I) is

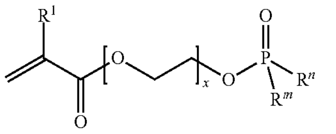

with $R^1$=H, Me, $R^n$, $R^m$=$O^-$, OH, Z, O—P(=O)$R^{n+1}R^{m+1}$ n, m=2-15 x=1, 2, 3 . . . , 50

Z = 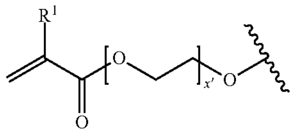

x'=x, 1, 2, 3 . . . , 50 optionally in the presence of $H_3PO_4$, $H_4P_2O_7$, their salts as well as acyclic/cyclic (poly)phosphates and their salts, and methyl (meth) acrylate.

The polyphosphate moiety may contain mono-, di-, tri- or higher phosphate, or a mono- and/or di-phosphonate.

The reactive diluent composition may comprise a solvent, such as a reactive solvent.

The organic phosphorus compound of formula (I) present in the reactive diluent composition preferably is a 2-hydroxy alkyl (meth)acrylate phosphate, such as 2-hydroxy ethyl methacrylate phosphate.

The reactive diluent composition may further comprise an organic solvent, such as an aliphatic hydrocarbon solvent or an aromatic hydrocarbon solvent, preferably a (meth)acrylate solvent.

Preferably, the reactive diluent composition contains 70 wt. % phosphate components and 30 wt. % of a reactive solvent.

In a specific embodiment of the present invention, the reactive diluent composition is a solution of 2-hydroxy ethyl methacrylate phosphate in methyl methacrylate (MMA). Preferably, the reactive diluent composition is a solution consisting of 70 wt. % 2-hydroxy ethyl methacrylate phosphate in 30 wt. % MMA.

Often, commercially available precursor molecules are mixtures, such as, for example, Sipomer PAM-4000 or PAM-100 or PAM-200 (from Solvay) or VISIOMER® HEMA-P 70M/100 (from Evonik). Such mixtures are contemplated herein, as well as precursor monomer units that are pure. HEMA (poly)phosphate (e.g. PAM-4000 from Solvay) can be made directly from HEMA and $P_2O_5$ or (poly)phosphoric acid. Alternatively, other monomers such as hydroxypropyl (meth)acrylate or 4-hydroxybutyl (meth) acrylate could be used in place of HEMA. Other examples include polyethylene glycol (meth)acrylate (poly)phosphate ester (PAM-100 from Solvay) and polypropylene glycol (meth)acrylate (poly)phosphate ester (PAM-200 from Solvay).

The Accelerator System (b)

The at least one iron salt or complex (i) present in the accelerator system (b) may be an iron (II) salt or complex, or an iron(III) salt or complex, or mixtures of iron(II) and iron(III) salts and complexes.

Advantageously, the iron salt or complex present in the accelerator system (b) is a iron(II) coordination compound. Preferably, said iron(II) coordination compound is selected from the group consisting of Iron(II) species ligated with mono- and polydendate N and/or O-donor ligands. Alternatively, the iron salt or complex present in the accelerator system (b) may also be selected from the group consisting of iron halides, carboxylates, 1,3-dioxo complexes and cyclopentadienyl-based iron complexes.

Examples of suitable iron carboxylates are iron lactate, iron naphthenate, iron 2-ethyl hexanoate (i.e. iron octanoate), iron formiate, iron acetate, iron propionate, iron butyrate, iron pentanoate, iron hexanoate, iron heptanoate iron octanonate, iron nonanoate, iron decanoate, iron neodecanoate, and iron dodecanoate, Examples of iron 1,3-dioxo complexes are iron acetoacetonate, and the iron complexes of acetyl acetone, benzoyl acetone, dibenzoyl methane, and acetoacetates such as diethyl acetoacetamide, dimethyl acetoacetamide, dipropylacetoacetamide, dibutylacetoacetamide, methyl acetoacetate, ethyl acetoacetate, propyl acetoacetate, and butylacetoacetate. Examples of iron cylcopentadienyl complexes are complexes comprising iron and two substituted or unsubstituted cyclopentadienyl ligands, wherein the optional substituents on the cyclopentadienyl ring are selected from the group consisting of alkyl, aryl, and alkenyl groups with 1 to 12 carbon atoms, which may be optionally substituted with heteroatoms selected from O, N, S, Si, and P. An example of an iron cylcopentadienyl complex is ferrocene.

In one embodiment of the present invention, the at least one iron salt or complex (i) present in the accelerator system (b) is iron(1+), chloro[dimethyl-9,9-dihydroxy-3-methyl-2,4-di(2-pyridinyl-κN)-7-[(2-pyridinyl-κN)methyl]-3,7-diazabicyclo[3.3.1]nonane-1,5-dicarboxylate-κ$N^3$, κ$N^7$]$^-$, chloride (1-) (CAS: 478945-46-9), with iron in the oxidation state+II, as depicted in formula (II) below.

(II)

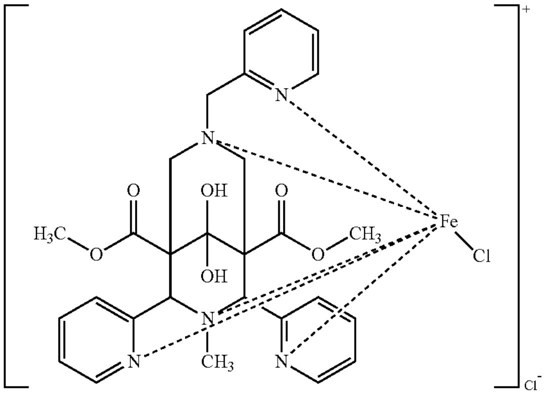

Such Fe complexes are commercially available, for example as Nouryact CF40 (Nouryon) or Borchi Oxy-Coat 1410 (Borchers GmbH). They are typically supplied as solution in a solvent such as e.g. 1,2-propane diol or reactive diluents such as, e.g. hydroxyethyl methacrylate.

The at least one transition metal salt or complex (ii) present in the accelerator system (b) may be a cobalt salt or complex, a copper salt or complex or a mixture of at least one cobalt salt or complex with at least one copper salt or complexes.

Advantageously, the at least one transition metal salt or complex selected from cobalt and copper (ii) present in the accelerator system (b) is a cobalt(II) salt or complex. Suitable cobalt salts or complexes are e.g. cobalt halides, nitrates, sulfates, sulfonates, phosphates, phosphonates, oxides, or carboxylates. Suitable carboxylates are e.g. lactate, 2-ethyl hexanoate, acetate, propionate, butyrate, oxalate, laurate, oleate, linoleate, palmitate, stearate, acetyl acetonate, octanoate, nonanoate, heptanoate, neodecanoate, or naphthenate. The cobalt(II) salt or complex is preferably a cobalt alkyl carboxylate, such as cobalt(II) ethylhexanoate, cobalt(II) octanoate, or cobalt acetylacetonates or cyclopentadienyl-based complexes of cobalt. Cobalt(2-ethylhexanoate), cobalt (neodecanoate) or cobalt (naphthenate) are particularly preferred.

Alternatively, the at least one transition metal salt or complex selected from cobalt and copper (ii) present in the accelerator system (b) is a copper(I) or copper (II) salt or complex. Suitable copper salts or complexes are e.g. copper halides (such as chlorides), nitrates, sulfates or alkyl carboxylates. Suitable carboxylates are e.g. lactate, 2-ethyl hexanoate, acetate, propionate, butyrate, oxalate, laurate, oleate, linoleate, palmitate, stearate, acetyl acetonate, octanoate, nonanoate, heptanoate, neodecanoate, or naphthenate. The copper(I) or copper (II) salt or complex is preferably an alkyl carboxylate. Copper(2-ethylhexanoate) is particularly preferred.

The ratio of the at least one iron salt or complex (i) to the transition metal salt or complex (ii) may be in the range of 2:1 to 500:1, preferably between 10:1 and 300:1. A ratio of the at least one iron salt or complex (i) to the transition metal salt or complex (ii) of 10:1 to 200:1 is particularly preferred.

The ratio of the organic phosphorus compound in the reactive diluent composition (a) to the metal content in the accelerator system (b) may be in the range of 80:1 to 4000:1.

The accelerator composition may comprise at least one solvent. The solvent for the cobalt (or copper) compound and for the iron compound may be the same or different and may e.g. be a hydroxyl-functional solvent.

The term "hydroxy-functional solvent" includes compounds of the formula (III)

$$HO—(CH_2—C(R^1)_2—(CH_2)_m—O—)_n—R^2 \quad \text{(III)},$$

wherein each $R^1$ is independently selected from the group consisting of hydrogen, alkyl groups with 1 to 10 carbon atoms, and hydroxyalkyl groups with 1 to 10 carbon atoms, n=1 to 10, m=0 or 1, and $R^2$ is hydrogen or an alkyl group with 1 to 10 carbon atoms. Most preferably, each $R^1$ is independently selected from H, $CH_3$, and $CH_2OH$. Examples of suitable hydroxy-functional solvents are glycols like diethylene monobutyl ether, ethylene glycol, diethylene glycol, dipropylene glycol, and polyethylene glycols, glycerol, and pentaerythritol.

In addition, the accelerator solution according to the present invention may further comprise additional organic compounds, such as aliphatic hydrocarbon solvents, aromatic hydrocarbon solvents, and solvents that carry an aldehyde, ketone, ether, ester, alcohol, phosphate, or carboxylic acid group. Examples of suitable solvents are aliphatic hydrocarbon solvents such as white spirit and odorless mineral spirit (OMS), aromatic hydrocarbon solvents such naphthenes and mixtures of naphthenes and paraffins, isobutanol; pentanol; 1,2-dioximes, N-methyl pyrrolidinone, N-ethyl pyrrolidinone; dimethyl formamide (DMF); dimethylsulfoxide (DMSO); 2,2,4-trimethylpentanediol diisobutyrate (TxIB); esters such as dibutyl maleate, dibutyl succinate, ethyl acetate, butyl acetate, mono- and diesters of ketoglutaric acid, pyruvates, and esters of ascorbic acid such as ascorbic palmitate; aldehydes; mono- and diesters, more in particular diethyl malonate and succinates; 1,2-diketones, in particular diacetyl and glyoxal; benzyl alcohol, fatty alcohols, and reactive diluents such as styrene, styrene derivatives or (meth)acrylates.

The total amount of solvent that is preferably present in the accelerator solution is 1 to 50 wt %, preferably 5 to 30 wt %.

In case the accelerator composition is an accelerator solution, the cobalt or copper may be present in an amount of at least 0.5 mmol/kg reactive diluent-containing resin, preferably at least 2 mmol/kg. The cobalt or copper is preferably present in the accelerator solution in an amount of less than 200 mmol/kg resin, preferably less than 50 mmol/kg resin, and more preferably less than 25 mmol/kg resin.

In case the accelerator composition is an accelerator solution, the iron may be present in an amount of at least 0.0001 mmol/kg resin, more preferably at least 0.01 mmol/kg resin. The iron is preferably present in the accelerator solution in an amount of less than 20 mmol/kg resin, more preferably less than 10 mmol/kg resin, and most preferably less than 1 mmol/kg resin.

The total amount of transition metal to be used in the process and compositions according to the present invention is preferably 0.5 to 100 mmol/kg reactive diluent-containing resin, more preferably 1 to 50 mmol/kg and most preferably 1 to 10 mmol/kg resin.

The accelerator composition may optionally contain one or more promoters, bases, water, inhibitors, additives, and/or fillers.

There are three important classes of promoters: carboxylate salts of ammonium, alkali metals, or alkaline earth metals, phosphorus-containing compounds and 1,3-diketones. Examples of 1,3-diketones are acetyl acetone, benzoyl acetone, and dibenzoyl methane, and acetoacetates such as diethyl acetoacetamide, dimethyl aceto-acetamide, dipropylacetoacetamide, dibutylacetoacetamide, methyl acetoacetate, ethyl acetoacetate, propyl acetoacetate, and butylacetoacetate.

Examples of suitable metal carboxylate salts of ammonium, alkali metals, and alkaline earth metals are the 2-ethyl hexanoates (i.e. octanoates), nonanoates, heptanoates, neodecanoates, and naphthenates. The preferred alkali metal is potassium (K). The salts may be added to the accelerator composition or the resin as such, or they may be formed in situ. For example, alkali metal 2-ethyl hexanoates can be prepared in situ in the accelerator composition, after addition of the alkali metal hydroxide and 2-ethyl hexanoic acid to the solution.

Examples of suitable phosphorus compounds are compounds with the formulae $P(R)_3$ and $P(R)_3{=}O$, wherein each R is independently selected from hydrogen, alkyl with 1 to 10 carbon atoms, and alkoxy groups with 1 to 10 carbon atoms. Preferably, at least two R-groups are selected from either alkyl groups or alkoxy groups. Specific examples of suitable phosphorus-containing compounds are diethyl phosphate, dibutyl phosphate, tributyl phosphate, triethyl phosphate (TEP), dibutyl phosphite, and triethyl phosphate.

Acetoacetates are particularly preferred promoters. Particularly preferred is diethyl acetoacetamide. Even more preferred is a combination of diethyl acetoacetamide and potassium 2-ethyl hexanoate.

If one or more promoters is/are present in the accelerator composition, their amount preferably is at least 0.01 wt %, more preferably at least 0.1 wt %, even more preferably at least 1 wt %, more preferably at least 10 wt %, and most preferably at least 20 wt %; preferably not more than 90 wt %, more preferably not more than 80 wt %, and most preferably not more than 70 wt %, all based on the total weight of the accelerator composition.

Suitable nitrogen-containing bases present in the accelerator composition and the pre-accelerated resin are primary, secondary, and tertiary amines such as triethyl amine, dimethylaniline, diethylaniline, or N,N-dimethyl-p-toludine (DMPT), polyamines such as 1,2-(dimethyl amine)ethane, secondary amines such as diethyl amine, ethoxylated amines such as triethanol amine, dimethylamino ethanol, diethanol amine, or monoethanol amine, and aromatic amines such as pyridine or bipyridine. The nitrogen-containing base is preferably present in the accelerator composition in an amount of 5 to 50 wt %.

To prevent undesirable polymerization, polymerization inhibitors (stabilizers) can be used in the accelerator composition according to the present invention. Within the context of the present invention, the terms "(polymerization) inhibitor" and "stabilizer" are used synonymously. Advantageously, the polymerization inhibitor is selected from the group consisting of hydroquinones, hydroquinone ethers such as hydroquinone monomethyl ether or di-tert-butylcatechol, phenothiazine, N,N'-(diphenyl)-p-phenylenediamine, 4-hydroxy-2,2,6,6-tetramethylpiperidin-1-oxyl, p-phenylenediamine, methylene blue or sterically hindered phenols, with an amount of stabilizer of between 0 and 1000 ppm. Preferably the amount of stabilizer is between 5 and 500 ppm and most preferably between 20 and 300 ppm. Preferably, the polymerization inhibitor is selected from hydroquinone monomethyl ether, 2,4-Dimethyl-6-tert-butylphenol, 2,6-di-tert-butyl-4-methyl-phenol, Octadecyl-3-(3,5-di-tert-butyl-4-hydroxyphenyl)-propionate (such as IRGANOX 1076) and 4-hydroxy-2,2,6,6-tetramethylpiperidin-1-oxyl, and mixtures thereof.

In a particularly preferred embodiment of the present invention, the reactive diluent composition (a) comprises or consists 2-hydroxy ethyl methacrylate phosphate, and the accelerator system (b) comprises iron(1+), chloro[dimethyl-9,9-dihydroxy-3-methyl-2,4-di(2-pyridinyl-κN)-7-[(2-pyridinyl-κN)methyl]-3,7-diazabicyclo[3.3.1]nonane-1,5-dicarboxylate-κ$N^3$, κ$N^7$]$^-$, chloride (1-) (CAS: 478945-46-9) and Co(II)-2-ethylhexanoat.

In an alternative embodiment, the reactive diluent composition (a) comprises or consists 2-hydroxy ethyl methacrylate phosphate, and the accelerator system (b) comprises iron(1+), chloro[dimethyl-9,9-dihydroxy-3-methyl-2,4-di(2-pyridinyl-κN)-7-[(2-pyridinyl-κN)methyl]-3,7-diazabicyclo[3.3.1]nonane-1,5-dicarboxylate-κ$N^3$, κ$N^7$]$^-$, chloride (1-) (CAS: 478945-46-9) and Cu(II)-2-ethylhexanoat.

The reactive diluent system according to the present invention is particularly suitable for preparing composite resins having flame-resistant properties and/or for preparing composite resins with enhanced glass fiber adhesion.

The Curable Resin Composition

The present invention further pertains to a curable resin composition comprising a curable resin and the reactive diluent system in its various embodiments as described above.

In a particularly preferred embodiment of the present invention, the organic phosphorus compound of the general formula (I) is 2-hydroxy ethyl methacrylate phosphate.

Suitable resins to be cured using the reactive diluent system according to the invention include alkyd resins, unsaturated polyester (UP) resins, vinyl ester (VE) resins, (meth)acrylate resins, polyurethanes, epoxy resins, and mixtures thereof.

Preferred resins are (meth)acrylate resins, UP resins and vinyl ester resins. In the context of the present application, the terms "unsaturated polyester resin" and "UP resin" refer to the combination of unsaturated polyester resin and ethylenically unsaturated monomeric compounds. The term "(meth)acrylate resin" refers to the combination of an acrylate or methacrylate resin and ethylenically unsaturated monomeric compounds. UP resins and acrylate resins as defined above are commonly known and commercially available.

Curing is generally started by either adding the accelerator solution according to the invention and the initiator (peroxide) to the resin, or by adding the initiator (peroxide) to the pre-accelerated resin.

Suitable UP resins to be cured by the process of the present invention are so-called ortho-resins, iso-resins, iso-NPG resins, and dicyclopentadiene (DCPD) resins. Examples of such resins are phthalic, Iso-phthalic, maleic, fumaric, allylic, vinylic, and epoxy-type resins, bisphenol A resins, terephthalic resins, and hybrid resins.

Vinyl ester resins have unsaturated sites only in the terminal position, introduced via reactions of epoxy resins with (meth)acrylic acid or hydroxyethyl (meth)acrylated. Typical examples of epoxy resins include bisphenol-A, novolac, tetraphenyloethane, cycloaliphatic, tetrabromobisphenol-A etc. Therefore, a vinyl ester resin is a (meth) acrylate functional resin. An additional class of vinyl ester resins are vinyl ester urethane resins also referred to as urethane methacrylate resins.

Acrylic resins as comprised in the resin compositions may be selected from thermoset acrylic resins or acrylic modified resins which are well known in the art. Acrylic resins include acrylates, methacrylates, diacrylates and dimethacrylates, and oligomers thereof. Oligomeric acrylates can be acrylated urethanes, epoxies polyesters polyethers, and acrylics. Additionally, acrylic resins can use pre-reacted polymer-inmonomer syrups made by polymerizing an acrylic monomer or co-polymerizing a mixture of different acrylic monomers to a specific degree of polymerization. Acrylic modified resins are a broad category of resins that are similar to oligomeric acrylates with the exception that acrylic modified resins use a base resin of sufficient molecular weight as not to be considered an oligomer. Methods for the preparation of acrylic modified resins are well known to those skilled in the art. Accordingly acrylic modified resins may contain solvents. The solvents may be inert to the resin system or they may be reactive therewith during the curing step. Reactive solvents or so-called reactive diluents are particularly preferred. They typically are comprised of ethylenically unsaturated monomeric compounds. Examples of ethylenically unsaturated monomeric compounds include styrene and styrene derivatives like a-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate and mixtures thereof. Suitable examples of (meth)acrylates reactive diluents are PEG200 di(meth) acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate,triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropanetri(meth)acrylate, glycidyl (meth)acrylate, (bis)maleimides, (bis)citraconimides, (bis)itaconimides, and mixtures thereof.

The amount of ethylenically unsaturated monomer in the pre-accelerated resin is preferably at least wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

In addition, the present invention provides a two-component composition comprising (a) the curable resin composition as described above as a first component, and (b) an initiator, e.g. a peroxide, as a second component.

Peroxides suitable for curing the resin and suitable for being present in the second component of the two-component composition include inorganic peroxides and organic peroxides, such as conventionally used ketone peroxides, peroxyesters, diaryl peroxides, dialkyl peroxides, and peroxydicarbonates, but also peroxycarbonates, peroxyketals, hydroperoxides, diacyl peroxides, and hydrogen peroxide. Preferred peroxides are organic hydroperoxides, ketone peroxides, peroxyesters, and peroxycarbonates. Even more preferred are hydroperoxides and ketone peroxides. Preferred hydroperoxides include cumyl hydroperoxide, 1,1,3,3-tetramethylbutyl hydroperoxide, tert-butyl hydroperoxide, isopropylcumyl hydroperoxide, tert-amyl hydroperoxide, 2,5-dimethylhexyl-2,5-dihydroperoxide, pinane hydroperoxide, para-menthane-hydroperoxide, terpene-hydroperoxide and pinene hydroperoxide. Preferred ketone peroxides include methyl ethyl ketone peroxide, methyl isopropyl ketone peroxide, methyl isobutyl ketone peroxide, cyclohexanone peroxide, and acetylacetone peroxide. Mixtures of two or more peroxides can also be used; for instance a combination of a hydroperoxide or ketone peroxide with a peroxyester.

A particularly preferred peroxide is methyl ethyl ketone peroxide. The skilled person will understand that these peroxides can be combined with conventional additives, for instance fillers, pigments, and phlegmatizers. Examples for phlegmatizers are hydrophilic esters and hydrocarbon solvents. The amount of peroxide to be used for curing the resin is preferably at least 0.1 per hundred resin (phr), more preferably at least 0.5 phr, and most preferably at least 1 phr. The amount of peroxide is preferably not more than 8 phr, more preferably not more than 5 phr, most preferably not more than 2 phr.

The reactive diluent system described above in its various embodiments and/or the curable resin composition described above in its various embodiments may be used for preparing composite resins having flame-retardant properties and/or for preparing composite resins with enhanced glass fiber adhesion.

Method of Preparing a Cured Composite Resin Composition

In an additional aspect, the present invention pertains to a method of preparing a cured composite resin composition, the method comprising (a) providing a curable resin composition as described above (b) optionally adding at least one organic or inorganic additive, and (c) initiating the curing process by adding an initiator.

The curing process can be carried out at any temperature from −15° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in sheet moulding compounds (SMC), bulk moulding compounds (BMC), pultrusion techniques, and the like, for which temperatures up to 180° C., more preferably up to 150° C., most preferably up to 100° C., are used.

Other optional additives may be employed in the curing process, such as fillers, fibers, pigments, dispersants, inhibitors, co-agents, and promoters. Examples of fibers are glass fibers, carbon fibers, aramid fibers, polyamide fibers, boron fibers, ceramic fibers, metal fibers, carbon fibers, and natural fibers (e.g. jute, kenaf, industrial hemp, flax (linen), ramie, etc.) or any combination thereof. The fiber content depends on the fiber type, the production process used and the final application area. For example, in SMC formulations e.g. glass fiber contents are preferably up to 35 wt % in combination with a high filler content up to 40 wt %. The resin content in SMC applications is preferably between 10 wt % to 20 wt %. BMC formulations contain a higher filler content with preferably 60 wt % and a lower fiber content with preferably 15 wt %. In hand lay-up a fiber content of up to 60 wt % is preferred. In spray-up applications a moderate glass fiber content of 30-35 wt % is preferred mainly using chopped glass fibers. In filament winding and pultrusion 30-80 wt % glass rovings are used.

The initiator may be as defined above. Advantageously, the initiator is an organic peroxide, preferably selected from the group consisting of methyl ethyl ketone peroxide (MEKP), benzoyl peroxide (BPO), cumene hydroperoxide (CuHP), or any combination thereof.

The Cured Fiber-Reinforced Composite Resin Composition

In general, fiber-reinforced resins (fiber-reinforced plastics—FRP) have the advantages of high relative strength, good surface condition of products, high corrosion resistance and high chemical resistance. With such advantages, these are used essentially as parts in housing materials, industrial materials, tanks, containers, ships, cars, trains, etc. Fiber-reinforced resins comprise a synthetic resin, as the binder, and reinforcing fibers added thereto, and are cured. If the adhesiveness between the reinforcing fibers and the resin is insufficient, their mechanical strength including rigidity and flexibility will often be poor.

In accordance with the above-described findings, the present invention also provides a fiber-reinforced material comprising (a) a polymer resin selected from the group consisting of (meth)acrylate resins, unsaturated polyester resins (UPR) or vinyl ester resins (VER); and (b) at least one reinforcing fiber material, preferably glass fibers;

that is obtainable by curing the components (a) and (b) in the presence of an initiator using the reactive diluent system according to the present invention.

The initiator and also the curing conditions may be as described in the above.

The reinforcing fibers for use in the fiber-reinforced material may be as defined above. Any ordinary fiber capable of being used for reinforcing resins can be employed in the fiber-reinforced material according to the present invention. Specifically, they may include, for example, glass fibers, carbon fibers, aramide fibers, polyamide fibers, boron fibers, ceramic fibers (e.g., silicon carbide fibers, alumina fibers), metal fibers, or natural fibers. These reinforcing fibers may have any form of yarns, rovings, strands, chopped strands, yarn cloths, roving cloths, etc.

The fiber-reinforced resin composition may further comprise at least one filler. Such filler may be selected from the group consisting of ATH (aluminum trihydroxide) or antimony oxides for flame retardance, calcium carbonate, and/or kaolin. Alternatively, or in addition thereto, the fiber-reinforced resin may also comprise at least one further additive selected from the group consisting of inhibitors, retarders, thixotropes (such as fumed silica), and/or UV absorbers, or mixtures thereof.

In the following, the invention is illustrated by non-limiting examples and exemplifying embodiments.

Examples

TABLE 1

| Components used | |
|---|---|
| Component | |
| Standard UPR 1 (based on isophthalic acid and standard glycols, solid) | Resin |
| Standard UPR 2 (based on orthophthalic acid and standard glycols, solid) | Resin |

TABLE 1-continued

| Components used | |
|---|---|
| Component | |
| VISIOMER ® HEMA-P 70M (Evonik) | Reactive diluent |
| Styrene (Merck) | Reactive diluent |
| Butanox M-50 (MEKP, Nouryon) | Initiator |
| Co(II)-2-Ethylhexanoat, 65%-solution (11% Co metal content, Sigma-Aldrich) | Activator |
| Octa-Soligen 12 Co HS (11.7 to 12.3% Co metal content, Borchers GmbH) | Activator |
| Borchi Oxy coat 1410 (8 to 9 wt % Fe metal content) supplied in 1,2-Propylene glycol (Borchers GmbH) | Activator |
| Nouryact CF40 (0.8 to 0.9 wt % Fe metal content) supplied in Hydroxyethyl methacrylate (Nouryon) | Activator |

Methods

Bulk Polymerization and Determination of the Polymerization Time

For the bulk polymerization the UPR was mixed with the reactive diluents and/or the phosphate compound according to table 2 and table 3. The accelerator or accelerator mix was added and the mixture was homogenized by stirring for 1 min followed by the addition of the initiator solution. The mixture was stirred again for 1 min and then transferred into a standard test tube (18×180 mm) to monitor the polymerization time. With the aid of a temperature sensor, the temperature profile of the reaction was recorded. This temperature sensor is within a second, smaller tube filled with tetraethylene glycol as a transfer fluid, which is fixed in the middle of the test tube such that it is immersed low enough into the sample liquid to enable an exact measurement of the sample temperature. The start of the measurement is considered to be the time of combination of the redox components. The position of the maximum reaction temperature $T_{max}$ corresponds to the polymerization time.

DSC Measurement (Determination of Glass Transition Temperature)

All samples were post-cured for 8 h at 80° C. prior the determination of the glass temperature. To determine glass transition temperature the commonly used analytical method differential scanning calorimetry (DSC) was used (Ref. Ehrenstein, Gottfried W. Riedel, Gabriela, Trawiel, Pia (2004); Thermal Analysis of Plastics—Theory and Practice, Hanser Publishers). The specimen produced by bulk polymerization was analyzed under nitrogen over the temperature range of −50° C. to 150° C. with a heating rate of 10K/min (after rapid cooling) in an aluminum crucible having a perforated lid (Mettler Toledo DSC instrument with liquid nitrogen cooling)

Mechanical Testing

The tensile testing was performed according to ISO 527-2. 200 g of resin formulation was used to cast dog bones. All samples were post-cured for 24 h at 80° C. in the oven prior to the tensile testing.

Water Absorption

Casted sample material of Example A-C and Reference 1 were immersed in demineralized water for three weeks. After 7 days and 21 days the samples were weighted, and the weight increase documented.

TABLE 2

UPR 1 + VISIOMER ® HEMA-P 70M under standard curing conditions using a cobalt-based curing system

| Resin Composition | Example 1 (Comparative) | Example 2 (Comparative) | Reference 1 |
|---|---|---|---|
| UPR 1 (phr) | 60 | 60 | 60 |
| Styrene (phr) | 39 | 35 | 40 |
| VISIOMER ® HEMA-P 70M (phr) | 1 | 5 | — |
| Co(II)-2-Ethylhexanoate (phr) | 0.22 | 0.22 | 0.22 |
| Metal content (phr) | 0.024 | 0.024 | 0.024 |
| MEKP (phr) | 2 | 2 | 2 |
| Cured state | Liquid | Partially liquid | Solid |
| Polytime measurements at RT (The FIG.) | | | |
| Polymerization Time (min) | No exothermic peak | No exothermic peak | 33 |
| Max. Temperature $T_{max}$(° C.) | | | 113 |

Results:

As evident from the polymerization time measurements shown in table 2, curing of a UPR under standard conditions using a cobalt-based curing system is not possible in the presence of a phosphorus compound like VISIOMER® HEMA-P 70M.

TABLE 3

Standard-Resin 1 + VISIOMER ® HEMA-P 70M new curing system

| Resin Composition | Example 3 | Example 4 | Example 5 | Example 6 | Reference 2 |
|---|---|---|---|---|---|
| UPR 1, (phr) | 60 | 36 | 60 | 60 | 60 |
| VISIOMER ® HEMA-P 70M (phr) | 20 | 20 | 20 | 20 | — |
| Styrene (phr) | 20 | 44 | 20 | 20 | 40 |
| Curing System | | | | | |
| Octa-Soligen 12 Co HS | 0.2 | 0.2 | 0.2 | 0.2 | 0.2 |
| Metal content (phr) | 0.024 | 0.024 | 0.024 | 0.024 | 0.024 |
| Nouryact CF40 (phr) | 0.015 | 0.015 | — | — | 0.015 |
| Metal content | 0.0001275 | 0.0001275 | | | 0.0001275 |
| Borchi Oxy coat 1410 | — | — | 0.015 | 0.020 | — |
| Metal content (phr) | | | 0.001275 | 0.0017 | |
| MEKP (phr) | 2 | 2 | 2 | 2 | 2 |
| Cured state | Solid | Solid | Solid | Solid | Solid |
| Polytime measurements at RT | | | | | |
| Time (min) | 80.5 | 55 | 73.3 | 75.5 | 13.5 |
| Max. Temperature (° C.) | 98.2 | 122.5 | 110.1 | 106.9 | 135.7 |
| Glass transition temperature [° C.] | 59 | 62 | n.a.* | n.a.* | 83 |

*not available

Results:

Examples 3 to 8 show that the curing is possible at different reactive diluent concentrations and a variation of the Fe-based accelerator.

Examples 3 to 8 show that a curing of VISIOMER® HEMA-P 70M containing resins at 20 wt % is possible with the described accelerator system using Cobalt and Iron based accelerators. Comparing example 3 and 7, it is also shown that depending on the supply form of the accelerator the Fe metal content can be significantly reduced. Nouryact CF40 is supplied in hydroxyethyl methacrylate as reactive diluent at 0.8 to 0.9 mg/kg. The reactive diluent increases the reactivity and the solubility of the accelerator in the resin mixture.

UPR 2—VISIOMER® HEMA-P 70M New Catalyst System and Mechanical Testing

TABLE 4

General formulation

| | | parts |
|---|---|---|
| Resin + reactive diluents | Composition given in Table 5 | 100 |
| Co-Accelerator | Octa-Soligen 12 Co HS | 0.200 |
| Fe-Accelerator | Borchi Oxy coat 1410 | 0.015 |
| | Sum | 100.215 |
| Initiator (added to resin amount) | Butanox M-50 | 2.00 |

Examples 9 to 11 and reference 3 were cured according to the formulation given in table 4 and table 5. The accelerator solutions were mixed prior to the addition to the resin. The initiator was added to the accelerated resins. All resins cured within 2.5 to 3.5 h at room temperature when casting 50 gram of resin formulation with a layer thickness of 2 cm.

TABLE 5

Detailed formulation and testing results for UPR Resin 2 and VISIOMER ® HEMA-P

| Resin Composition | Example 9 | Example 10 | Example 11 | Reference 3** |
|---|---|---|---|---|
| UPR 2 Palatal (phr) | 38 | 38 | 38 | 38 |
| Styrene (phr) | 52 | 42 | 32 | 62 |
| VISIOMER ® HEMA-P 70M (phr) | 10 | 20 | 30 | |
| Mechanical Properties | | | | |
| E-Modulus (MPa) | 4357 | 4497 | 4380* | 4369 |
| F max (N) | 1450 | 1933 | 306 | 1682 |
| Stress max ($N/mm^2$) | 38.4 | 50.7 | 104 | 44.3 |
| Water absorption | | | | |
| After 7 days (weight increase, %) | 0.82 | 1.4 | 3.71 | 0.33 |
| After 21 days (weight increase, %) | 0.5 | 2.24 | 2.4 | 0.50 |

*samples very brittle, only 4 measurements instead of 6 possible

Examples 9 to 11 cured well and the mechanical data coincide well with the styrene-based reference. The mechanical properties of Example 9 and 10 are comparable to the pure styrene-based reference system. The water-uptake increases with increasing HEMA-P amount due to its hydrophilic nature.

The FIGURE shows the polymerization time measurement for UPR 1 in the presence of VISIOMER® HEMA-P 70M in comparison to the styrene-based references using a standard cobalt-based curing system.

The invention claimed is:

1. A reactive diluent system for composite resins, comprising:

(a) a reactive diluent composition, and (b) an accelerator system, wherein the reactive diluent composition (a) comprises an organic phosphorus compound of the formula (I)

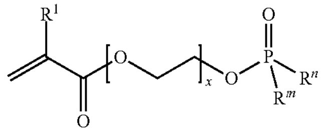

wherein $R^1$=H or Me;

$R^n$, $R^m$=O—, OH, Z, or O—P(=O) $R^{n+1}R^{m+1}$;

n, m=2-15;

X=1, 2, 3 . . . , 50;

Z =

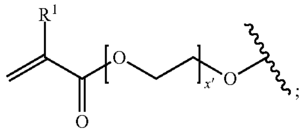

;

and x'=x, 1, 2, 3 . . . , 50, optionally in the presence of $H_3PO_4$, $H_4P_2O_7$, their salts as well as acyclic/cyclic (poly) phosphates and their salts, and methyl (meth)acrylate, wherein the polyphosphate moiety may contain mono-, di-, tri- or higher phosphate, or a mono- and/or di-phosphonate; and wherein the accelerator system (b) comprises (i) at least one iron salt or complex;

(ii) at least one cobalt (II) salt or complex; and (iii) optionally, at least one solvent.

2. The reactive diluent system according to claim 1, wherein the organic phosphorus compound of formula (I) present in the reactive diluent composition (a) comprises 2-hydroxy ethyl methacrylate phosphate, optionally in the presence of $H_3PO_4$, $H_4P_2O_7$, their salts as well as acyclic/cyclic (poly) phosphates and their salts, and methyl (meth)acrylate, wherein the polyphosphate moiety may contain mono-, di-, tri- or higher phosphate, or a mono- and/or di-phosphonate.

3. The reactive diluent system according to claim 1, wherein the organic phosphorus compound of the general formula (I) present in the reactive diluent composition (a) comprises a 2-hydroxy alkyl (meth)acrylate phosphate, optionally in the presence of methyl (meth)acrylate.

4. The reactive diluent system according to claim 1, wherein the at least one iron salt or complex (i) present in the accelerator system (b) is an iron (II) species ligated with mono- or polydendate N and/or O-donor ligands;

or wherein the at least one iron salt or complex (i) present in the accelerator system (b) is selected from the group consisting of iron halides, carboxylates, 1,3-dioxo complexes, and cyclopentadienyl-based iron complexes.

5. The reactive diluent system according to claim 1, wherein the at least one iron salt or complex (i) present in the accelerator system (b) is an iron complex comprising a tridentate, tetradentate, pentadentate, or hexadentate nitrogen/oxygen donor ligand.

6. The reactive diluent system according to claim 1, wherein the cobalt(II) salt or complex is an alkyl carboxylate. 7. The reactive diluent system according to claim 1, wherein a ratio of the at least one iron salt or complex (i) to the at least one cobalt (II) salt or complex (ii) is in the range of 2:1 to 100:1.

8. The reactive diluent system according to claim 1, wherein a ratio of the organic phosphorus compound in the reactive diluent composition (a) to a metal content in the accelerator system (b) is in the range of 90 to 1 to 3000:1.

9. A curable resin composition, comprising:

a curable resin; and the reactive diluent system according to claim 1.

10. A method for preparing a composite resin with flame-retardant properties and/or with enhanced glass fiber adhesion, the method comprising:

mixing the reactive diluent system according to claim 1 with a curable resin.

11. A method of preparing a cured composite resin composition, the method comprising:

(a) providing the curable resin composition according to claim 9, (b) optionally, adding at least one organic or inorganic additive, and (c) initiating a curing process by adding an initiator.

12. The method according to claim 11, wherein the at least one organic or inorganic additive is a pigment, a dispersant, and/or a fiber material.

13. The method according to claim 11, wherein the initiator is an organic peroxide.

14. A fiber-reinforced material, comprising:

a resin composition, comprising (a) a polymer resin selected from the group consisting of (meth)acrylate resins, unsaturated polyester resins (UPR), and vinyl ester resins (VER); and (b) at least one reinforcing fiber material, wherein the fiber-reinforced material is obtainable by curing the components (a) and (b), in the presence of an initiator, with the reactive diluent system according to claim 1.

15. The fiber-reinforced material according to claim 14, wherein the resin composition further comprises at least one filler selected from the group consisting of aluminum trihydroxide (ATH), an antimony oxide, calcium carbonate, kaolin, and mixtures thereof, and/or wherein the resin composition further comprises at least one additive selected from the group consisting of inhibitors, retarders, thixotropes, UV absorbers, and mixtures thereof.

16. The reactive diluent system according to claim 3, wherein the 2-hydroxy alkyl (meth)acrylate phosphate is 2-hydroxy ethyl methacrylate phosphate.

17. The method according to claim 12, wherein the fiber material is selected from the group consisting of glass fibers, carbon fibers, aramide fibers, polyamide fibers, boron fibers, ceramic fibers, metal fibers, carbon fibers, natural fibers, and a combination thereof.

18. The method according to claim 13, wherein the organic peroxide is selected from the group consisting of methyl ethyl ketone peroxide (MEKP), benzoyl peroxide (BPO), cumene hydroperoxide (CuHP), and a combination thereof.

* * * * *